UNITED STATES PATENT OFFICE.

WILLIAM E. FERSLEW, OF NEW ORLEANS, LOUISIANA.

IMPROVEMENT IN COMPOUNDS FOR MAKING ARTIFICIAL STONE.

Specification forming part of Letters Patent No. 143,563, dated October 14, 1873; application filed June 23, 1873.

*To all whom it may concern:*

Be it known that I, WILLIAM E. FERSLEW, of New Orleans, in the State of Louisiana, have invented a certain Improved Compound for the Making of Artificial Stone, to be used for building and other purposes for which natural stone is used, and of which the following is a full specification:

First, I take two parts of clean sharp sand and one part of Boulogne Portland cement, which are thoroughly mixed, and then dampened with a liquid composed of one part of sulphuric acid and four hundred parts of water. This forms the facing of my stone, and is placed in the mold to the thickness of about one inch. I next take one part of Fall City of Louisville, Kentucky, cement, and two parts of clean sharp sand and gravel, mix the same thoroughly, and then dampen with a liquid composed of one part of muriatic acid and three hundred parts of water. It is then successively placed in the mold and rammed until it is filled. The stone is immediately removed from the mold, exposed for twelve hours, and then placed in a bath of silicate of soda, 1.396° specific gravity, for twenty-four hours, and, after drying for about twelve hours, placed in a bath of a solution of carbonate of lime in muriatic acid, 1.261° specific gravity, for six hours. The stone is now exposed to the sun and air for two days, and is then ready for use.

I claim as my invention—

In the manufacture of artificial stone, heavy Portland cement for the outside and light American cement for the inside, compounded and treated in the manner described.

W. E. FERSLEW.

Witnesses:
B. STILLE,
A. P. THORLAND.